US012811136B2

(12) United States Patent
Park et al.

(10) Patent No.: US 12,811,136 B2
(45) Date of Patent: Nov. 24, 2026

(54) ANODE ACTIVE MATERIAL FOR SECONDARY BATTERY AND METHOD OF PREPARING THE SAME

(71) Applicant: SK On Co., Ltd., Seoul (KR)

(72) Inventors: Eun Jun Park, Daejeon (KR); Sang Hye Shin, Daejeon (KR); Joon Hyung Moon, Daejeon (KR); Myoung Lae Kim, Daejeon (KR); Dong Wook Ha, Daejeon (KR)

(73) Assignee: SK On Co., Ltd., Seoul (KR)

( * ) Notice: Subject to any disclaimer, the term of this patent is extended or adjusted under 35 U.S.C. 154(b) by 851 days.

(21) Appl. No.: 18/071,696

(22) Filed: Nov. 30, 2022

(65) Prior Publication Data

US 2023/0178718 A1 Jun. 8, 2023

(30) Foreign Application Priority Data

Dec. 2, 2021 (KR) ........................ 10-2021-0170858

(51) Int. Cl.

| | |
|---|---|
| ***H01M 4/36*** | (2006.01) |
| ***H01M 4/04*** | (2006.01) |
| ***H01M 4/58*** | (2010.01) |
| ***H01M 4/62*** | (2006.01) |
| ***H01M 10/052*** | (2010.01) |
| *H01M 4/02* | (2006.01) |

(52) U.S. Cl.

CPC ......... *H01M 4/366* (2013.01); *H01M 4/0471* (2013.01); *H01M 4/5825* (2013.01); *H01M 4/625* (2013.01); *H01M 10/052* (2013.01); *H01M 2004/021* (2013.01); *H01M 2004/027* (2013.01)

(58) Field of Classification Search

CPC .. H01M 4/366; H01M 4/0471; H01M 4/5825; H01M 4/625; H01M 10/052; H01M 2004/027

See application file for complete search history.

(56) References Cited

U.S. PATENT DOCUMENTS

2020/0212427 A1* 7/2020 Jiang ................ H01M 10/0525

FOREIGN PATENT DOCUMENTS

| | | | | |
|---|---|---|---|---|
| CN | 103855358 B | 10/2017 | | |
| CN | 111403693 A | 7/2020 | | |
| CN | 112103480 A | * 12/2020 | ........ | H01M 10/4235 |
| CN | 112151777 A | 12/2020 | | |
| CN | 112018367 B | 3/2021 | | |
| EP | 3678229 A1 | 7/2020 | | |

(Continued)

OTHER PUBLICATIONS

English Translation of CN 112103780 A (Year: 2020).*

(Continued)

*Primary Examiner* — Jeffrey T Barton
*Assistant Examiner* — Anna G. Newell
(74) *Attorney, Agent, or Firm* — Jones Day

(57) ABSTRACT

An anode active material for a lithium secondary battery is provided which includes a composite including: a silicon-based material including a lithium silicate; and a lithium-containing phosphate, wherein a peak intensity ratio B/A is 0.01 to 0.5, wherein A is a peak intensity at 2θ=28.5°, and B is a peak intensity at 2θ=22.3°, when an X-ray diffraction (XRD) analysis is performed using a Cu—Kα ray.

14 Claims, 2 Drawing Sheets

(56) References Cited

FOREIGN PATENT DOCUMENTS

| | | | |
|---|---|---|---|
| JP | 2016-066579 | A | 4/2016 |
| JP | 6596405 | B2 | 10/2019 |
| JP | 2020-077510 | A | 5/2020 |
| KR | 20160113842 | A | 10/2016 |
| KR | 10-2019-0017785 | A | 2/2019 |
| KR | 102025119 | B1 | 11/2019 |
| KR | 20210089653 | A | 7/2021 |
| WO | 2016/121326 | A1 | 8/2016 |
| WO | 2018/123322 | A1 | 7/2018 |

OTHER PUBLICATIONS

Bradley XRD in Materials Analysis 2025 (Year: 2025).*
Korean Patent Office, Appl. 20210170858, Office Action, May 1, 2023.
European Patent Office, Appl. 22210670, European Search Report, Apr. 28, 2023.
Korean Patent Office, Appl. 20210170858, Search Report, Mar. 14, 2023.
Hofmann et al., Surface Modification of LiNi(0.8)Co(0.15)Al(0.05)O(2) Particles via Li(3)PO(4) Coating to Enable Aqueous Electrode Processing, ChemSusChem, 13(22), p. 5962-5971. Oct. 2020.
CNIPA, Appl. 202211539774.2, Office Action, May 29, 2025.

* cited by examiner

ANODE ACTIVE MATERIAL FOR SECONDARY BATTERY AND METHOD OF PREPARING THE SAME

CROSS-REFERENCE TO RELATED APPLICATIONS

This application claims priority under 35 U.S.C. § 119 to Korean Patent Application No. 10-2021-0170858, filed on Dec. 2, 2021, in the Korean Intellectual Property Office, the disclosure of which is incorporated herein by reference in its entirety.

TECHNICAL FIELD

The following disclosure relates to an anode active material for a secondary battery and a method of preparing the same.

BACKGROUND

Recently, the demand for eco-friendly technologies to assist with the mitigation of the global warming has rapidly increased. In particular, in accordance with an increase in technical demand for an electric vehicles having energy storage systems (ESSs), the demand for lithium secondary batteries has also seen a substantial increase.

SUMMARY

In one embodiment, the present disclosure provides an anode active material having properties that may improve an initial coulombic efficiency and a capacity of a battery into which it is incorporated, thereby improving lifespan characteristics of the battery.

In another embodiment, the present disclosure provides methods to mitigate an increase in pH in an anode slurry prepared during manufacture, as well as a side reaction occurring during charging and discharging, which may be caused by residual lithium compound.

In one aspect, the present disclosure provides an anode active material for a lithium secondary battery, the anode active material comprising a composite comprising: a) a silicon-based material comprising a lithium silicate; and b) a lithium-containing phosphate.

As used herein, lithium silicate refers to a compound or mixture of compounds, each independently represented by the following Chemical Formula (1):

$$Li_xSi_yO_z \quad (1),$$

wherein $1 \le x \le 6$, $1 \le y \le 4$, and $0 < z \le 7$.

Some non-limiting examples of lithium silicate include one or more of $LiSiO_4$, $Li_2SiO_3$, $Li_2SiO_5$, $Li_2Si_2O_5$, $Li_4SiO_4$, and $Li_6Si_2O_7$.

In one embodiment, a lithium-containing phosphate compound includes a compound or mixture of compounds, each of which may independently be described by the following Chemical Formula 2:

$$Li_aP_bO_c \quad (2)$$

wherein $1 \le a \le 4$, $1 \le b \le 4$, and $0 < c \le 7$.

In some embodiments, the lithium-containing phosphate includes one or more of $Li_3PO_4$ and $Li_4P_2O_7$.

In some embodiments, the anode active material may be characterized by an X-ray diffraction (XRD) pattern having characteristic peaks at about 22.3 °2θ and about 28.5 °2θ, wherein XRD analysis is performed using a Cu—Kα ray. In some embodiments, the ratio of the intensity of the peak at about 22.3 °2θ to the intensity of the peak at about 28.5 °2θ is about 0.01 to about 0.5.

In some embodiments, the anode active material for a lithium secondary battery have a phosphorus content of about 2.5 wt % or less based on a total weight of the anode active material. In some embodiments, the anode active material for a lithium secondary battery may have a ratio of lithium to phosphorus (Li/P) of about 100 or less.

In some embodiments, the anode active material for a lithium secondary battery comprises a composite having a core-shell structure. In some embodiments, the core-shell structure comprises a) a core comprising silicon-based material comprising a lithium silicate; and b) a shell disposed on a surface of the core and containing a lithium-containing phosphate.

In some embodiments, the anode active material for a lithium secondary battery further comprises amorphous carbon.

The anode active material for a lithium secondary battery may further comprises one or more of natural graphite and artificial graphite.

In another aspect, a method of preparing an anode active material for a lithium secondary battery is provided. In one embodiment, a method of preparing an anode active material comprises

- mixing a silicon-based material including a silicon oxide with a lithium precursor during a pre-lithiation process;
- treating the silicon-based material with heat to incorporate lithium into the silicon-based material during a doping process thereby generating a lithium silicate; and
- adding the silicon-based material doped with lithium to a phosphate during a compounding process.

In some embodiments, the phosphate is $NaH_2PO_4$.

In some embodiments, the compounding step includes adding the silicon-based material doped with lithium to a cleaning solution containing a phosphate In some embodiments, the compounding step utilizes a molar concentration of phosphate to the cleaning solution of about more than 0.005M and about 2.0 M or less.

In another aspect, the present disclosure provides an anode for a lithium secondary battery, which comprises the anode active material comprising a composite comprising: a) a silicon-based material comprising a lithium silicate; and b) a lithium-containing phosphate.

In another general aspect, provided herein is a lithium secondary battery that comprises an anode, which comprises the anode active material comprising a composite comprising: a) a silicon-based material comprising a lithium silicate; and b) a lithium-containing phosphate.

Other features and aspects will be apparent from the following detailed description, the drawings, and the claims.

BRIEF DESCRIPTION OF THE DRAWINGS

Illustrative embodiments of anode active material the will now be described in relation to the accompanying drawings, in which.

DETAILED DESCRIPTION OF EMBODIMENTS

Figure 1:
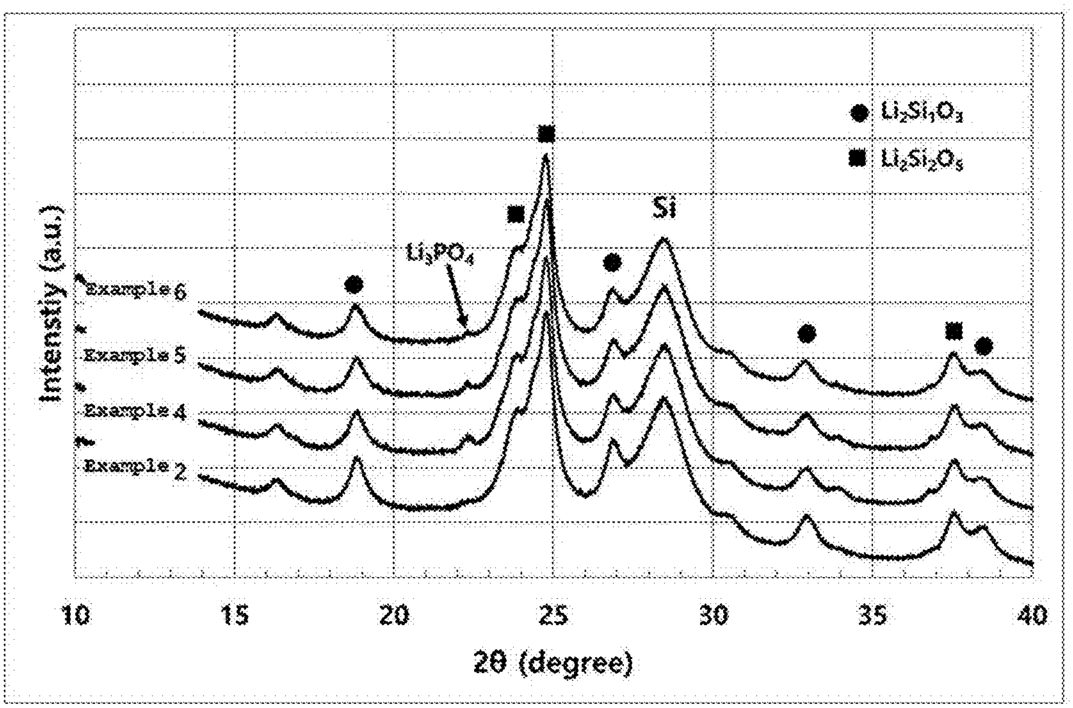
FIG. 1 provides X-ray diffraction (XRD) analysis results of the material prepared according to the methods described in Examples 2, 4, 5, and 6.

The advantages and features of the present disclosure and methods of accomplishing them will become apparent from exemplary embodiments described in detail with the accompanying drawings. However, the present disclosure is not limited to exemplary embodiments to be described below, but may be implemented in various different forms. These exemplary embodiments will be provided only in order to make the present disclosure complete and allow those skilled in the art to completely recognize the scope of the present disclosure, and the present disclosure will be defined by the scope of the claims. Specific contents for implementing the present disclosure will be described in detail with reference to the accompanying drawings. The same reference numerals refer to the same components regardless of the drawings. The term "and/or" includes any and all combinations of one or more of the listed items.

Unless defined otherwise, all terms (including technical and scientific terms) used in the present disclosure have the same meanings as commonly understood by those skilled in the art to which the present disclosure pertains. Throughout the present disclosure, unless explicitly described to the contrary, "comprising" any components will be understood to imply further inclusion of other components rather than the exclusion of any other components. In addition, the singular forms are intended to include the plural forms, unless the context clearly indicates otherwise.

In the present disclosure, it will be understood that when an element such as a layer, a film, a region, a plate, or the like, is referred to as being "on" or "above" another element, it may be directly on another element or may have an intervening element present therebetween.

In the present disclosure, an average particle size may be referred to as "D50." As used herein, D50 refers to the particle size at which 50% of the particles in the composition are greater than said particle size and 50% are smaller than said particle size, for example, when measured by a laser scattering method using MASTERSIZER™ 3000 manufactured by Malvern Panalytical Ltd. Ethanol may be used as a solvent. The ethanol may dispersed using an ultrasonic disperser and a volume density may be measured.

Carbon (C)-based anode active materials such, as natural graphite and artificial graphite, provide one example of anode active materials in the lithium secondary batteries. Graphite may have a sub-optimal energy density, potentially having a theoretical capacity of only 372 mAh/g.

In some examples, silicon (Si)-based anode active material, having a high theoretical capacity of 3,580 mAh/g, may provide a solution for increasing an energy density. In some instances, a Si-based anode active material may have lifespan characteristics due to volume expansion (e.g., to 400%) during repeated charging and discharging.

In one example, a silicon oxide ($SiO_x$)-based anode active material having a lower volumetric expansion ratio than that of the Si-based anode active material may be utilized. The $SiO_x$-based anode active material may have lifespan characteristics superior to those of the Si-based anode active material as evidenced, for example, by a lower volumetric expansion ratio. In some instances, a battery into which a $SiO_x$-based anode active material is incorporated may exhibit a low initial coulombic efficiency (ICE) due to formation of an irreversible phase in the initial stage of driving. This, in turn, may limit industrial applicability.

According to one embodiment of the present disclosure, an anode active material comprising a silicon-based material may be subjected to a pre-lithiation process to improve an initial coulombic efficiency (ICE) of a battery and to which a silicon-based anode active material is applied in the initial stage of driving. A lithium silicate incorporated into the anode active material by the pre-lithiation process may address and help overcome low initial coulombic efficiency. However, residual lithium compound, such as LiOH or $LiCO_3$, may remain on a surface without reacting during the pre-lithiation process, which may interfere in the manufacture of the anode. In particular, the residual lithium compound may cause an increase in pH of an anode slurry when dissolved in a solvent during the preparation of the anode slurry. When the pH of the slurry is increased, chains of a polymer binder in the slurry contract and decrease the viscosity of the slurry, which may cause reduced adhesion between the current collector and the anode active material. In some instances, the residual lithium compound may react with water during manufacture of an electrode, which generates a large amount of hydrogen gas. The large amount of hydrogen gas generated may cause reduced stability of the anode slurry. Therefore, incorporation of lithium silicate into an anode should be carefully considered and controlled to optimize battery performance without sacrificing structure or stability.

In one aspect, the present disclosure provides an anode active material for a lithium secondary battery, the anode active material comprising a composite comprising:

(a) a silicon-based material comprising a lithium silicate; and (b) a lithium-containing phosphate.

In one embodiment, the composite may comprise a lithium-containing phosphate provided at least partially on a surface of the lithium silicate-containing silicon-based material. In some embodiments, the composite may have a core-shell structure comprising:

(a) a core comprising a lithium silicate-containing silicon-based material; and (b) a shell disposed on a surface of the core and containing a lithium-containing phosphate.

In some embodiments where lithium-containing phosphate is provided on a surface of the lithium silicate-containing silicon-based material, elution of residual lithium compound to the surface may be at least partially suppressed, thereby potentially improving the stability of a slurry during manufacture and reducing generation of hydrogen gas.

In some embodiments, such as those where the composite has a core-shell structure, the shell may be characterized by an average thickness of about 0.1 nm to about 100 nm, about 1 nm to about 10 nm, or about 2 nm to about 5 nm.

Residual lithium compound may, in some embodiments, be present in micro-cracks inside the silicon-based material or on the surface of the silicon-based material. In some embodiments, residual lithium in the anode active material may be removed by converting the residual lithium compound to a lithium-containing phosphate. In such embodiments, when residual lithium compound is converted to a lithium-containing phosphate, a concentration gradient of lithium-containing phosphate, from surface to the center of the silicon-based material, is formed. As such, in some embodiments, elution of residual lithium compound in a slurry may be effectively suppressed.

In some embodiments, the anode active material for a lithium secondary battery may be characterized by a phosphorus content of 2.5 wt % or less or 2.3 wt % or less based on a total weight of the anode active material. In some embodiments, the anode active material for a lithium secondary battery may be characterized by a phosphorus content of 0.05 wt % or more, 0.07 wt % or more, or 0.1 wt % or more, based on the total weight of the anode active material. In some embodiments, the anode active material for a lithium secondary battery may be characterized by a phosphorus content of 0.05 wt % to 2.3 wt %, 0.05 wt % to 2.5 wt %, 0.07 wt % to 2.3 wt %, 0.07 wt % to 2.5 wt %, 0.1 wt % to 2.3, or 0.1 wt % to 2.5 wt %. The amount of phosphorous is not particularly limited, however, lithium-containing phosphate, when incorporated at higher concentrations, may cause a reduction in electrical conductivity, which in turn, may cause a reduction in initial coulombic efficiency.

In some embodiments, the anode active material for a lithium secondary battery may be characterized by lithium to phosphorous ratio (Li/P), of 100 or less, 60 or less, or 30 or less.

Advantageously, the phosphorus content and Li/P may be varied in order to avoid phosphate from being produced in an excessively large amount and to secure an appropriate amount of lithium-containing phosphate, therefore addressing the problem caused by the residual lithium compound and to sufficiently improve the initial coulombic efficiency of the battery.

For example, in some embodiments, the anode active material for a lithium secondary battery may have a phosphorus content of 0.05 wt % or more and an Li/P of 100 or less, for example, 60 or less or 30 or less. In some embodiments, the anode active material for a lithium secondary battery may have a phosphorus content of 0.07 wt % or more, and an Li/P of 100 or less, for example, 60 or less or 30 or less. In some embodiments, the anode active material for a lithium secondary battery may have phosphorus content of 0.1 wt % or more and a Li/P of 100 or less, for example, 60 or less or 30 or less.

In another example, in some embodiments, the anode active material for a lithium secondary battery may be characterized by a phosphorus content of 2.5 wt % or less and a Li/P of 100 or less, for example, 60 or less or 30 or less. In another example, in some embodiments, the anode active material for a lithium secondary battery may have a phosphorus content of 2.3 wt % or less and an Li/P of 100 or less, for example, 60 or less or 30 or less.

In another example, in some embodiments, the anode active material for a lithium secondary battery may have a phosphorus content of 0.05 to 2.5 wt % and an Li/P of 100 or less, for example, 60 or less or 30 or less. In another example, in some embodiments, the anode active material for a lithium secondary battery may have a phosphorus content of 0.07 to 2.5 wt % and an Li/P of 100 or less, for example, 60 or less or 30 or less. In another example, in some embodiments, the anode active material for a lithium secondary battery may have a phosphorus content of 0.1 to 2.5 wt %, and an Li/P of 100 or less, for example, 60 or less or 30 or less.

In another example, in some embodiments, the anode active material for a lithium secondary battery may have a phosphorus content of 0.05 to 2.3 wt % and an Li/P of 100 or less, for example, 60 or less or 30 or less. In another example, in some embodiments, the anode active material for a lithium secondary battery may have a phosphorus content of 0.07 to 2.3 wt % and an Li/P of 100 or less, for example, 60 or less or 30 or less. In another example, in some embodiments, the anode active material for a lithium secondary battery may have a phosphorus content of 0.1 to 2.3 wt % and an Li/P of 100 or less, for example, 60 or less or 30 or less.

In any embodiment, the phosphorus content and lithium in an anode active material may be measured by inductively coupled plasma (ICP) spectrometry.

The anode active material or composite thereof may also be characterized by X-ray diffraction (XRD). For example, in some embodiments, an anode active material including composite comprising: a) a silicon-based material comprising a lithium silicate; and b) a lithium-containing phosphate may be characterized by a XRD pattern having characteristic peaks at about 22.3 °2θ and about 28.5 °2θ, wherein XRD analysis is performed using a Cu—Kα ray, wherein the peak at 22.3 °2θ is related to the lithium-containing phosphate, and the peak at 28.5 °2θ is related to the lithium silicate. In some embodiments, the anode active material for a lithium secondary battery may be characterized by a peak intensity ratio B/A of about 0.01 to about 0.5, wherein A is the peak intensity at $2\theta=28.5°$, and B is the peak intensity at $2\theta=22.3°$.

In some embodiments, the peak intensity ratio B/A may be, for example, 0.01 or more, 0.03 or more, 0.05 or more, or 0.1 or more. In some embodiments, the peak intensity ratio B/A may be, for example, 0.5 or less, 0.35 or less, or 0.25 or less. In some embodiments, the peak intensity ration B/A may be about 0.01 to 0.35, 0.01 to 0.25, 0.03 to 0.5, 0.03 to 0.35, 0.03 to 0.25, 0.05 to 0.5, 0.05 to 0.35, 0.05 to 0.25, 0.1 to 0.5, 0.1 to 0.35, or 0.1 to 0.25.

Hereinafter, the lithium-silicate-containing silicon-based material and the lithium-containing phosphate that may be included in the composite of the anode active material of a lithium secondary battery will be described in detail.

In some embodiments, lithium silicate may be provided at least partially on the surface of the silicon-based material. In some embodiments, the silicon-based material may have a core-shell structure which comprises a) a core containing the silicon-based material; and b) a shell disposed on a surface of the core comprising a lithium-containing phosphate.

As used herein, lithium silicate refers to a compound or a mixture of compounds, each compound independently represented by the following Chemical Formula 1:

$$Li_xSi_yO_z \quad (1)$$

wherein:

$1 \le x \le 6$;

$1 \le y \le 4$; and $0 < z \le 7$.

For example, in some embodiments, x is 1, 2, 4, or 6. In some embodiments, y is 1, 2, 3, or 4. In some embodiments, z is 0, 1, 2, 3, 4, 5, 6, or 7. Some non-limiting examples of lithium silicate include one or more of $LiSiO_4$, $Li_2SiO_3$, $Li_2SiO_5$, $Li_2Si_2O_5$, $Li_4SiO_4$, and $Li_6Si_2O_7$. For example, the lithium silicate may include one or more of $Li_2SiO_3$, $Li_2Si_2O_5$, and $Li_4SiO_4$. In some embodiments, the lithium silicate includes one or both of $Li_2SiO_3$ and $Li_2Si_2O_5$. In some embodiments, the lithium silicate includes $Li_2SiO_3$. In some embodiments, the lithium silicate does not include $Li_4SiO_4$. For example, in some embodiments, it may be difficult to control physical properties of a $Li_4SiO_4$ slurry at the time of manufacture of an electrode in comparison to $Li_2SiO_3$ and $Li_2Si_2O_5$. In consideration of this, for example, the lithium silicate may include one or more of $Li_2SiO_3$ and $Li_2Si_2O_5$. In some embodiments, a smaller amount of silicon is consumed forming $Li_2SiO_3$ phase in comparison to the amount of silicon consumed forming $Li_2SiO_5$ phase or $Li_4SiO_4$ phase. As such, it may be possible to further improve capacity characteristics, for example, through reducing the change in volume of silicon during a battery cycle lifespan, thereby potentially improving lifespan characteristics of the battery. In consideration of this, for example, the lithium silicate may include $Li_2SiO_3$.

In some embodiments, the silicon-based material may further include one or more of silicon, an oxide of silicon ($SiO_x$, wherein $1 \leq x \leq 2$), a Si-Q alloy, and a Si-carbon composite, wherein Q is an element selected from the group consisting of an alkali metal, an alkaline earth metal, a Group 13 element, a Group 14 element, a Group 15 element, a Group 16 element, a transition metal, a rare earth element, and a combination thereof, provided Q is not silicon. For example, in any embodiment, the element Q may be, for example, selected from the group consisting of Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and any combination thereof. Non-limiting examples of Si-Q alloys include $Li_{3.75}Si$ or $Li_{4.4}Si$.

According to the present disclosure, a composite of an anode active material may comprise a lithium-containing phosphate. As used herein, lithium-containing phosphate refers to a compound or mixture of compounds, each independently represented by one of the following Chemical Formulas (2) and (3), $LiH_2PO_4$, and $CH_3COOP(O)(OK)(OLi)$:

$$Li_aP_bO_c \quad (2)$$

$$Li_pA_qD_rPO_4 \quad (3)$$

wherein:

$1 \leq a \leq 4$;

$1 \leq b \leq 4$;

$0 < c \leq 7$;

A is an element selected from the group consisting of Co, Mn, Ni, Fe, Cu, and Cr;

D is an element selected from the group consisting of Mg, Ca, Sr, Ba, Ti, Zr, Zn, Nb, V, B, Al, Ga, In, Si, Ge, Sc, and Y;

$0.9 < p < 1.1$;

$0 < q \leq 1.0$;

$0 \leq r < 1.0$; and $0.9 < q + r < 1.1$.

In some embodiments, a is 1, 2, 3, or 4. In some embodiments, b is 1, 2, 3, or 4. In some embodiments, c is 0, 1, 2, 3, 4, 5, 6, or 7. In some embodiments, the lithium-containing phosphate comprise one or more of $Li_3PO_4$ and $Li_4P_2O_7$. In some embodiments, the lithium-containing phosphate comprises $Li_3PO_4$.

In some embodiments, the anode active material for a lithium secondary battery may further include amorphous carbon. Non-limiting examples of amorphous carbon include soft carbon, hard carbon, mesophase pitch carbide, calcined coke, and combinations thereof.

In some embodiments, the anode active material for a lithium secondary battery may further include one or both of natural graphite and artificial graphite. Graphite is a material capable of reversibly intercalating and deintercalating lithium ions, and may have at least one of an amorphous shape, a plate shape, a flake shape, a spherical shape, and a fibrous shape.

In another aspect, the present disclosure provides a method of preparing an anode active material for a lithium secondary battery, the method comprising:

mixing a silicon-based material including a silicon oxide with a lithium precursor during a pre-lithiation process;

treating the silicon-based material with heat to incorporate lithium into the silicon-based material during a doping process thereby generating a lithium silicate; and adding the silicon-based material doped with lithium to a phosphate during a compounding process.

In some embodiments, the compounding process comprises agitating the resulting mixture, for example, by stirring the mixture. In some embodiments, the silicon-based material may comprise a silicon oxide. The method of preparing the silicon-based material is not particularly limited. For example, in any embodiment, the silicon-based material may be prepared by mixing a silicon powder with a silicon oxide (e.g., $SiO_2$) powder, and treating with heat. The prepared silicon-based material may subsequently be pulverized into particles.

Non-limiting examples of lithium precursors include, lithium hydride, lithium hydroxide, lithium oxide, lithium carbide, lithium particles, and any combination thereof. For example, in some embodiments, the lithium precursor includes one or more of LiOH, Li, LiH, $Li_2O$, and $Li_2CO3$. The silicon compound may be mixed with the lithium precursor at any desired ration, for example, at a molar ratio of lithium/silicon of 0.3 to 1.0, 0.4 to 1.0, 0.3 to 0.8, or 0.4 to 0.8. The heat treatment may be performed under an inert atmosphere at an elevated temperature, which may be, for example, about 500° C. to about 1,000° C. or about 500° C. to about 800° C. The heat treatment may be carried out for a sufficient amount of time to result in the silicon-based material, for example, for about 1 hour to about 12 hours, such as about 1 hour to about 8 hours. Advantageously, by using the methods described herein above, a lithium silicate having a relatively excellent effect of reducing volume expansion may be produced, which is advantageous for improving lifespan characteristics of a battery.

Alternatively, the lithium silicate may be prepared by a lithium doping process comprising an electrochemical method or a redox method.

According to an exemplary embodiment, the silicon-based material may be doped with lithium by the pre-lithiation process described above to generate lithium silicate, as described herein, to yield a lithium silicate-containing silicon-based material. For example, the lithium silicate that is generated and incorporated into the silicon-based material may include one or more of $LiSiO_4$, $Li_2SiO_3$, $Li_2SiO_5$, $Li_2Si_2O_5$, $Li_4SiO_4$, and $Li_6Si_2O_7$.

As disclosed herein, the method of preparing an anode active material for a lithium secondary battery may include preparing a composite via a compounding process which comprises wet-mixing the silicon-based material doped with lithium with a phosphate. In some embodiments, the compounding process may comprise adding the silicon-based material doped with lithium to a cleaning solution containing a phosphate and subsequently agitating the mixture, e.g., by stirring.

Suitable phosphates include materials containing phosphate ions and are not particularly limited. Non-limiting examples of phosphates include one or more of $NH_4H_2PO_4$, $(NH_4)_2HPO_4$, $H_3PO_4$, and $NaH_2PO_4$. The phosphate may be, for example, $NaH_2PO_4$. The cleaning solution, if used, may be any cleaning solution commonly used in the art, is not particularly limited, and may be, for example, distilled water. Advantageously, a cleaning solution may be used to clean the electrode and prepare the composite simultaneously. The stirring speed and time is not particularly limited and may be, for example, about 200 to about 600 rpm or about 300 to about 500 rpm for a period of about 10 to about 60 minutes or about 20 to about 60 minutes.

To solve the problem caused by the residual lithium compound by securing an appropriate amount of lithium-containing phosphate while preventing generation of an excessively large amount of phosphate, a molar concentration of the phosphate to the cleaning solution may be, for example, more than 0.005M and 2.0M or less, 0.007 to 2.0M, 0.01 to 2.0 M, 0.03 to 2.0 M, 0.05 to 2.0 M, or 0.1 to 2.0 M.

In any embodiment, after the stirring, drying may be performed, for example, under vacuum, to obtain an anode active material for a lithium secondary battery.

An anode for a lithium secondary battery may contain an anode active material as described herein. The anode active material may be incorporated into the anode in an anode active material layer, which may comprise a) a current collector, b) the anode active material disposed on the current collector, and c) an aqueous binder.

In any embodiment, the current collector may comprise a material selected from the group consisting of a copper foil, a nickel foil, a stainless steel foil, a titanium foil, nickel foam, copper foam, a polymer substrate coated with a conductive metal, and any combination thereof. However, material suitable for use as a current collector is not limited to the examples described above.

The aqueous binder may aid adherence of anode active material particles to each other and adherence of the anode active material to the current collector. Non-limiting examples of aqueous binder include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid (PAA), an ethylene-propylene-diene polymer (EPDM), a sulfonated-EPDM, styrene-butadiene rubber (SBR), fluoro rubber, copolymers thereof, and any combination. For example, the aqueous binder may include a polyacrylic acid (PAA)-based binder. However, the aqueous binder is not limited to the examples described above.

In any embodiment, the anode active material may optionally further include one or more of a material capable of reversibly intercalating and deintercalating lithium ions, a lithium metal, a lithium metal alloy, a material capable of doping and dedoping lithium, and a transition metal oxide.

One non-limiting example of a material capable of reversibly intercalating and deintercalating lithium ions is a carbon-based material. In some embodiments, a lithium secondary battery comprises an anode, the anode comprising an anode active material comprising a carbon-based material. Non-limiting examples of carbon-based materials include crystalline carbon, amorphous carbon, and combinations thereof. Non-limiting examples of crystalline carbon include graphite, such as natural graphite or artificial graphite, having an amorphous shape, a plate shape, a flake shape, a spherical shape, or a fibrous shape. Examples of amorphous carbon include soft carbon, hard carbon, mesophase pitch carbide, and calcined coke.

Non-limiting examples of lithium metal alloys include alloys of lithium and a metal selected from the group consisting of Na, K, Rb, Cs, Fr, Be, Mg, Ca, Sr, Si, Sb, Pb, In, Zn, Ba, Ra, Ge, Al, and Sn.

Non-limiting examples of a material capable of reversibly doping and dedoping lithium is tin (Sn), $SnO_2$, a Sn—R alloy, and a Sn-carbon composite, wherein R is selected from the group consisting of Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and any combination thereof. In some embodiments, a lithium secondary battery comprise an anode comprising a anode active material comprises at least one of Sn, $SnO_2$, a Sn—R alloy, a Sn-carbon composite, and $SiO_2$.

A non-limiting example of a transition metal oxide is lithium titanium oxide.

In any embodiment, an anode active material layer may optionally further include a conductive material. The conductive material is not particularly limited, provide it is suitable to impart conductivity to the electrode. Any conductive material may be used as long as it is a material that does not cause a chemical change in the battery and has conductivity. Non-limiting examples of the conductive material include a carbon-based material such as natural graphite, artificial graphite, carbon black, acetylene black, Ketjen black, or a carbon fiber; a metal-based material such as a metal powder or a metal fiber of copper, nickel, aluminum, or silver; a conductive polymer such as a polyphenylene derivative; and a mixture thereof.

The anode active material layer may comprise, for example, binder in an amount of about 1 wt % to 10 wt % and conductive material or about 1 wt % to 5 wt %, with respect to a total weight of the anode active material layer. However, the binder content of the anode active material and the conductive material content of the anode active material are not limited to the examples described above.

In another aspect, the present disclosure provides a lithium secondary battery comprising an anode with anode active material as described herein, a cathode, a separator disposed between the anode and the cathode, and an electrolyte.

The cathode may include, for example, a current collector and a cathode active material layer formed by applying a cathode slurry containing a cathode active material onto the current collector.

The cathode active material layer may include a cathode active material, and may optionally further include a binder and a conductive material. Any cathode active material known in the art may be used. For example, the cathode active material may be a composite oxide of lithium and a metal selected from cobalt, manganese, nickel, and a combination thereof. However, the cathode active material is not limited to the examples described above. The binder and conductive material of the cathode active material may be the same, for example, as the anode binder and the anode conductive material described herein or may be any materials known in the art. The binder and the conductive material are not limited to the examples described herein.

The separator may include, for example, a glass fiber, polyester, polyethylene, polypropylene, polytetrafluoroethylene, or a combination thereof, and may be in a form of a nonwoven fabric or a woven fabric.

The material and form of the separator are not limited to the examples described herein. Any separator known in the art may be used. In one embodiment, the separator may be, for example, a polyolefin-based polymer separator formed of polyethylene, polypropylene, or the like. In another embodiment, the separator may be coated with a composition containing a ceramic component or a polymer material to secure heat resistance or mechanical strength. The separator may optionally have, for example, a single layer or multi-layer structure.

The electrolyte may contain, for example, an organic solvent and a lithium salt. The organic solvent may serve, for example, as a medium through which ions involved in the electrochemical reaction of the battery may move. The organic solvent may be, for example, one solvent or a mixture of two or more solvents. Examples of suitable solvents include, but not limited to, carbonate-based solvents, ester-based solvents, ether-based solvents, ketone-based solvents, alcohol-based solvents, and aprotic solvents. Where a mixture of two or more solvents is used, a mixing ratio may be appropriately adjusted according to a desired battery performance. However, the organic solvent is not limited to the examples described herein.

A lithium salt may be dissolved in the organic solvent to act as a supply source of lithium ions in the battery to allow a basic operation of the lithium secondary battery and promote movement of the lithium ions between the cathode and the anode. Non-limiting examples of lithium salt include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, LiCl, LiI, $LiB(C_2O_4)_2$, and any combination thereof, wherein x and y are natural numbers. However, the lithium salt is not limited to the examples described herein.

In some embodiments, a concentration of 0.1 to 2.0 M of lithium salt is used, which advantageously generates an electrolyte with appropriate conductivity and viscosity, and thus, may exhibit excellent electrolyte performance.

In order to improve charging and discharging characteristics, flame retardancy properties, and the like, the electrolyte, in any embodiment, may further comprise one or more of pyridine, triethyl phosphate, triethanolamine, cyclic ether, ethylene diamine, n-glyme, hexamethyl phosphoric acid triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, aluminum trichloride, and the like. For example, in order to impart non-flammability, the electrolyte may further comprise a halogen-containing solvent, such as one or more of carbon tetrachloride or ethylene trifluoride. In another example, in order to impart conservation properties at a high temperature, the electrolyte may further comprise one or more of fluoro-ethylene carbonate (FEC), propane sultone (PrS), fluoro-propylene carbonate (FPC), or the like.

The process of manufacturing a lithium secondary battery is not limited. For example, in one embodiment, a process of manufacturing a lithium secondary battery comprises:

a) sequentially stacking an anode comprising an anode active material as described herein, a separator, and a cathode to form an electrode assembly;
b) putting the prepared electrode assembly into a cylindrical battery case or a prismatic battery case; and
c) injecting an electrolyte as described herein.

In another embodiment, the lithium secondary battery may be manufactured by a process comprising:

a) sequentially stacking an anode comprising an anode active material as described herein, a separator, and a cathode to form an electrode assembly;
b) impregnating the electrode assembly with an electrolyte;
c) putting the resultant product into a battery case; and
d) sealing the battery case.

Any battery case commonly used in the art may be use. The battery case may be of any shape, for example, a cylindrical, prismatic, pouch, or coin type case.

The lithium secondary battery comprising an anode incorporating the anode active material according to the present disclosure may be used as a battery cell used as a power source for any device, such as a small device. In some embodiments the lithium secondary battery may be used as a unit cell in a medium and large sized battery module which comprises a plurality of battery cells. Examples of applications of the medium and large sized battery module include electric vehicles, hybrid electric vehicles, plug-in hybrid electric vehicles, and power storage systems. However, the applications of the lithium secondary battery are not limited to the examples described above.

Hereinafter, examples and comparative examples of the present disclosure will be described. However, each of the following examples is merely a preferred example of the present disclosure, and the present disclosure is not limited to the following examples.

EXAMPLES

Example 1: Preparation of Silicon Compound

A mixed raw material of silicon and silicon dioxide was introduced into a reaction furnace, the mixed raw material was vaporized in an atmosphere under vacuum (10 Pa) at 600° C. for 5 hours. The vaporized mixed raw material was deposited onto an absorbing plate, cooled, and then a deposit was taken out and pulverized by a ball mill to obtain SiO particles having an average particle size of (D50) of 8 μm.

Pre-Lithiation Process

The prepared SiO particles and a LiH powder were mixed at a molar ratio of Li/Si of 0.4 to 1.0 to form a mixed powder. The mixed powder was filtered using a 25 to 500 μm sieve and the filtered mixed powder was placed in an alumina crucible.

The alumina crucible was subjected to a heat treatment under a nitrogen gas atmosphere at 700° C. for 4 to 10 hours. Subsequently, a lithium silicate-containing silicon-based material was prepared by collecting the heat-treated powder and pulverizing the collected powder in a mortar to an average particle size of the silicon-based material (D50) of about 5.0 μm.

Preparation of Composite $NaH_2PO_4$ was completely dissolved in distilled water to prepare a $NaH_2PO_4$ cleaning solution (0.01 M, 50 ml). The silicon-based material doped with lithium prepared in the previous step was added to the $NaH_2PO_4$ cleaning solution, and stirring was performed to clean the silicon-based material doped with lithium. The stirring was performed for 30 minutes while maintaining a speed of 400 rpm. After the stirring, the cleaning solution was removed by filtration, and the resulting filter cake was dried under vacuum overnight, thereby preparing a composite.

Manufacture of an Anode 80 wt % of the prepared composite, 10 wt % of Super C, and 10 wt % of a polyacrylic acid (PAA)-based binder were mixed with distilled water to prepare a slurry. An anode was manufactured by a common process of applying the slurry onto a Cu foil current collector, drying, and rolling.

Manufacture of a Half-Cell

A polyethylene (PE) separator was disposed between the manufactured anode and a counter electrode formed of a lithium metal, and then an electrolyte was injected, thereby manufacturing a CR2016 type coin cell. The assembled coin cell was rested at room temperature for 3 to 24 hours to manufacture a half-cell. In this case, a mixture obtained by mixing a lithium salt (1.0 M $LiPF_6$) with an organic solvent (EC:EMC=3:7 vol %) and an electrolyte additive FEC (2 vol %) was used as the electrolyte.

Examples 2 to 11: Preparation of Silicon Compounds, Composites, and Half-cells

In Examples 2 to 11, silicon compounds and composites were prepared and anodes and half-cells were manufactured under the same conditions as those of Example 1, except that cleaning and stirring were performed by applying the molar concentrations shown in Table 1 instead of the molar concentration of 0.01 M of the $NaH_2PO_4$ cleaning solution in the Preparation of Composite step of Example 1.

For example, in Example 2, the silicon compound and the composite were prepared and the anode and the half-cell were manufactured under the same conditions as those of Example 1, except that a $NaH_2PO_4$ cleaning solution (0.03 M, 50 ml) was used in Preparation of Composite step of Example 1.

Comparative Example 1

In Comparative Example 1, a silicon compound and a composite were prepared and an anode and a half-cell were manufactured under the same conditions as those of Example 1, except that cleaning and stirring were performed with distilled water to which $NaH_2PO_4$ was not added in Preparation of Composite step of Example 1.

Comparative Example 2

In Comparative Example 2, silicon compounds and composites were prepared and anodes and half-cells were manufactured under the same conditions as those of Example 1, except that cleaning and stirring were performed by applying the molar concentrations shown in Table 1 instead of the molar concentration of 0.01 M of the $NaH_2PO_4$ cleaning solution in Preparation of Composite step of Example 1.

Various characteristics of the resultant products prepared in Examples 1 to 11 and Comparative Examples 1, 2 were evaluated by methods to be described below.

1. Evaluation of Characteristics of Composite

X-Ray Diffraction (XRD) Analysis

An XRD analysis using a Cu—Kα ray was performed to evaluate whether a lithium-containing phosphate was included in the anode active material for a lithium secondary battery, and the background data of XRD results was removed as following conditions.

(1) Apply straight background

Range: 10~80°, Bending Factor: 0, Granularity (degree of data division): 100

(2) $Al_3PO_4$ peak fitting

Range: 20.5~25.4°, fitting by deconvolution with 4 peaks

Peak position: about 22.2° ($Al_3PO_4$), about 23.8°, 24.3°, 24.7° ($Li_2Si_2O_5$)

(3) Si Peak fitting

Range: 27.4~32.0°

Peak position: about 28.3° (Si)

FIG. 1 is a graph showing the XRD analysis results of Examples 2, 4, 5, and 6.

Figure 2:
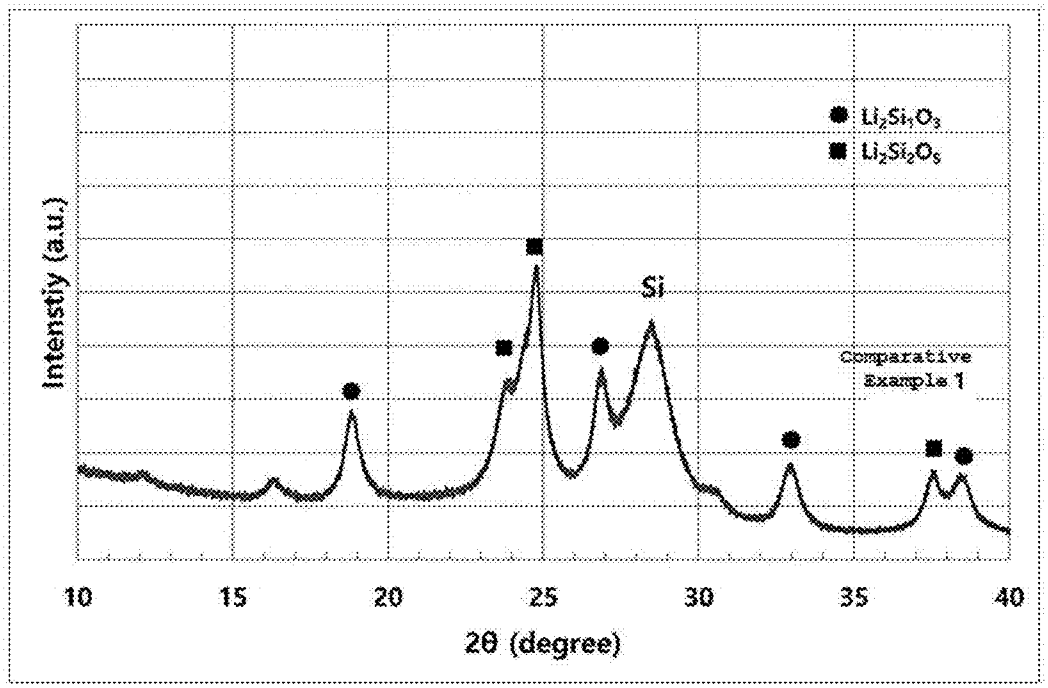
FIG. 2 provides XRD analysis results of the material prepared according to the methods described in Comparative Example 1.

FIG. 2 is a graph showing the XRD analysis result of Comparative Example 1.

It was confirmed from FIG. 1 that in Examples 2, 4, 5, and 6 in which the lithium-containing phosphate was included, the peak appeared at $2\theta=22.3°$, whereas it was confirmed from FIG. 2 that in Comparative Example 1, a peak did not appear at $2\theta=22.3°$ because a lithium-containing phosphate was not included.

Scanning Electron Microscope (SEM) Analysis

An SEM analysis was performed to evaluate whether a lithium-containing phosphate was formed in the anode active material for a lithium secondary battery of each of Examples.

Figure 3:
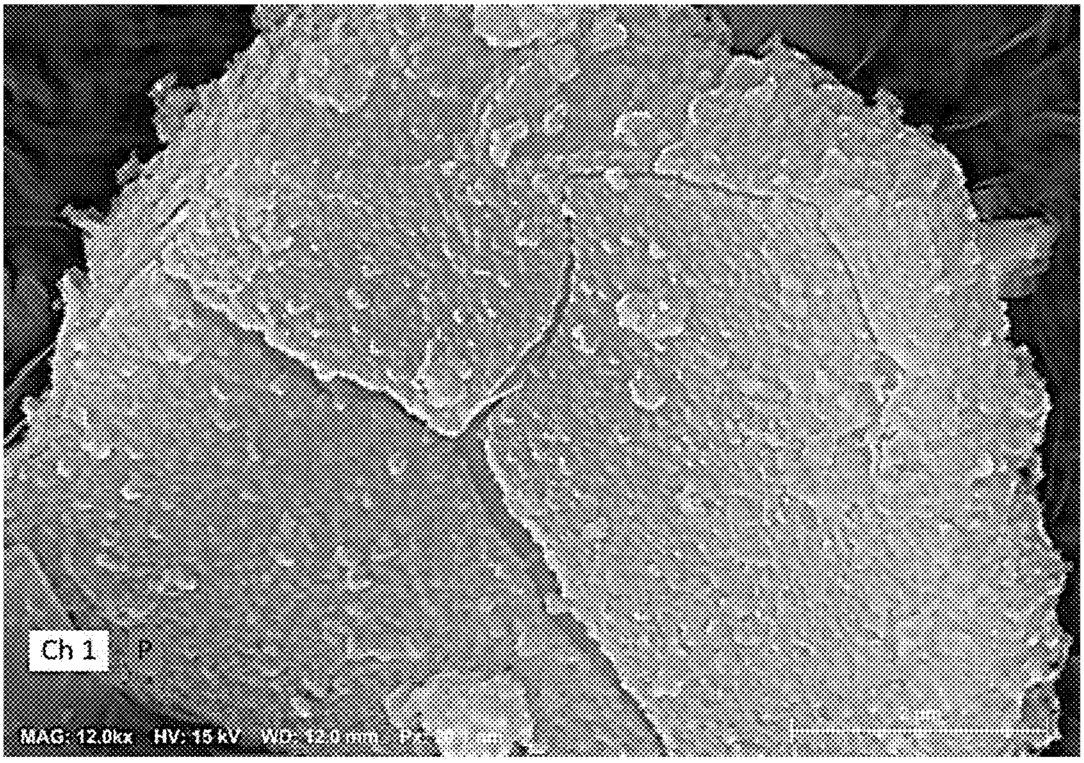
FIG. 3 provides a scanning electron microscope (SEM) mapping image of the material prepared according to the methods described in Example 7.

FIG. 3 is the SEM mapping image of Example 7.

Referring to FIG. 3, it could be confirmed that phosphorus was uniformly coated on the surface of the composite including a lithium-containing phosphate of Example 7.

2. Evaluation of Initial Coulombic Efficiency and Slurry Preparation Ability according to Concentration of $NaH_2PO_4$ The initial coulombic efficiency and slurry preparation ability according to a concentration of $NaH_2PO_4$ were evaluated.

Evaluation of Initial Coulombic Efficiency

The half-cells of Examples 1 to 11 and Comparative Examples 1 and 2 were charged with a constant current of 0.1 C rate at room temperature (25° C.) until a voltage reached 0.01 V (vs. Li), and then the charging process was cut off at a current of 0.01 C rate while maintaining the voltage of 0.01 V in a constant voltage mode, thereby charging the half-cells at a constant voltage. The half-cells were discharged at a constant current of 0.1 C rate until the voltage reached 1.5 V (vs. Li). The charging and discharging efficiency obtained after performing one more cycle of the charging and discharging under the same conditions as those of the charging and discharging conditions described above was evaluated as an initial coulombic efficiency (%).

Evaluation of Slurry Preparation Ability

A slurry containing 13 wt % of the composite prepared in Preparation of Composite step, 83 wt % of artificial graphite, 1.5 wt % of carboxymethyl cellulose, 2 wt % of styrene butadiene rubber, 0.5 wt % of a conductive material single-walled carbon nanotube (SWCNT) and having a solid content of 40 wt % was prepared. 4 ml of the prepared slurry was injected into a gas tight syringe and was left at room temperature for 7 days in a state where an inlet was sealed.

Thereafter, a slurry gas generation rate was calculated by the following Equation 1. The result thereof is shown in Table 1. The higher the slurry gas generation rate derived by Equation 1, the lower the slurry preparation ability. In Equation 1, the slurry volume was measured by reading the scale of the syringe containing gas.

$$\text{Slurry gas generation rate (\%)} = (\text{Slurry volume after one day} - \text{Initial slurry volume})/(\text{Initial slurry volume}) \times 100 \quad \text{Equation 1:}$$

In Table 1, "$NaH_2PO_4$" indicates the molar concentration of the $NaH_2PO_4$ cleaning solution.

In Table 1, the contents (wt %) of the composition elements of silicon (Si), lithium (Li), and phosphorus (P) indicate the contents of the respective elements in the composite. The contents of the composition elements were measured using a high frequency inductively coupled plasma (ICP) spectrometer (OPTIMA™ 8300, manufactured by PerkinElmer, Inc).

In Table 1, "Li/P" was derived by substituting the content (wt %) of lithium and the content (wt %) of phosphorus measured by the ICP spectrometer described above.

In Table 1, "B/A" was measured by applying a current of 40 mA with a voltage of 45 kV using an Empyrean XRD diffractometer manufactured by Malvern Panalytical Ltd. "B/A" is a value derived by calculating a peak intensity ratio B/A from the XRD analysis results by performing the XRD analysis using a Cu—Kα ray.

A is a peak intensity at $2\theta=28.5°$, and B is a peak intensity at $2\theta=22.3°$.

TABLE 1

| | Composition element content | | | | | | Initial | Slurry gas |
|---|---|---|---|---|---|---|---|---|
| | $NaH_2PO_4$ (M) | Si (wt %) | Li (wt %) | P (wt %) | Li/P | B/A | coulombic efficiency (%) | generation rate (%) |
| Example 1 | 0.01 | 51.4 | 5.9 | 0.10 | 59.0 | 0.04 | 83.2 | 60 |
| Example 2 | 0.03 | 51.5 | 5.2 | 0.25 | 20.8 | 0.06 | 83.4 | 15 |
| Example 3 | 0.05 | 51.3 | 5.2 | 0.36 | 14.4 | 0.09 | 83.6 | 10 |
| Example 4 | 0.1 | 50.1 | 5.1 | 0.86 | 5.9 | 0.11 | 83.4 | 0 |
| Example 5 | 0.3 | 50.2 | 4.5 | 0.51 | 8.8 | 0.08 | 84.5 | 0 |
| Example 6 | 0.5 | 51.6 | 4.6 | 0.60 | 7.67 | 0.08 | 84.1 | 0 |
| Example 7 | 1.0 | 50.3 | 4.5 | 0.78 | 5.77 | 0.11 | 83.9 | 10 |
| Example 8 | 1.5 | 51.2 | 4.2 | 1.59 | 2.64 | 0.24 | 83.6 | 0 |
| Example 9 | 2.0 | 50.8 | 4.3 | 2.30 | 1.87 | 0.31 | 82.9 | 5 |
| Example 10 | 2.5 | 51.1 | 4.5 | 2.64 | 1.70 | 0.39 | 80.1 | 5 |
| Example 11 | 3.0 | 50.9 | 4.4 | 2.60 | 1.69 | 0.41 | 79.4 | 10 |
| Comparative Example 1 | — | 51.1 | 6.1 | 0.01 | 610 | 0.01 | 83.5 | 200 |
| Comparative Example 2 | 0.005 | 51.4 | 6.0 | 0.04 | 150 | 0.01 | 83.4 | 180 |

Referring to Table 1, each of Examples and Comparative Examples was evaluated.

Referring to Table 1, it was confirmed that, in the anode active materials prepared according to Examples 1 to 11, Li/P was 100 or less, and the value of B/A was more than 0.01 and 0.5 or less. In Examples 1 to 11, the initial coulombic efficiency was about 80-83%, which was excellent, and the slurry gas generation rate was 60% or less, which showed that the initial coulombic efficiency and the slurry preparation ability were excellent.

In Examples 1 to 9, in which the phosphorus content was 2.5 wt % or less, the initial coulombic efficiency was about 83%, which was excellent, and the slurry gas generation rate was 60% or less, which showed that the initial coulombic efficiency and the slurry preparation ability were excellent.

In Examples 10 and 11 in which a relatively excessive amount of phosphate was added to the cleaning solution, the phosphorus content was more than 2.5 wt %. As a result, the slurry gas generation rate was 10% or less, which was excellent, and the initial coulombic efficiency was relatively inferior to that of Examples 1 to 9. It was determined that a large amount of lithium-containing phosphate was formed and thus the side reaction between the residual lithium compound and water that occurred in Comparative Examples 1 and 2 was suppressed, but the initial coulombic efficiency was deteriorated because sufficient electrical conductivity was not secured.

In Comparative Example 1 in which a phosphate was not added to the cleaning solution, since phosphorous was an impurity level, the value of Li/P was more than 100, and the value of B/A was also 0.1 or less. As a result, the initial coulombic efficiency was excellent, but the slurry preparation ability was deteriorated because the slurry gas generation rate reached 200%. It was determined that a large amount of hydrogen gas was generated by the reaction of the residual lithium compound with water, and thus, the viscosity of the slurry was reduced, resulting in deterioration of the slurry preparation ability.

In Comparative Example 2 in which a sufficient phosphate was not added to the cleaning solution, since the phosphorus content was higher than that in Comparative Example 1, the value of Li/P was more than 100, and the value of B/A was also 0.1 or less. As a result, the initial coulombic efficiency was excellent, but the slurry preparation ability was deteriorated because the slurry gas generation rate reached 180%. It was determined that the side reaction between the residual lithium compound and water that occurred in Comparative Example 1 was not sufficiently suppressed because the amount of the lithium-containing phosphate produced in Comparative Example 2 was too small.

The scope of the present disclosure should not be limited to the described exemplary embodiments, but the claims and all modifications equal or equivalent to the claims are intended to fall within the spirit of the present disclosure.

What is claimed is:

1. An anode active material for a lithium secondary battery, comprising a composite, the composite comprising:
   a silicon-based material comprising a lithium silicate; and
   a lithium-containing phosphate, wherein the anode active material is characterized by an X-ray diffraction (XRD) pattern having peaks at 22.3and 28.5°2θ, wherein the peak intensity ratio B/A is more than 0.01 and 0.35 or less, wherein A is the intensity of the peak at 2θ=28.5°, and B is the intensity of the peak at 2θ=22.3°, and wherein the XRD analysis is performed using a Cu-Kα ray, and wherein in the anode active material, based on a total weight of the anode active material, a ratio of a total lithium content to a total phosphorus content (Li/P) is 60 or less.

2. The anode active material for a lithium secondary battery of claim 1, wherein the anode active material has the total phosphorus content of 2.5 wt % or less based on the total weight of the anode active material.

3. The anode active material for a lithium secondary battery of claim 1, wherein the lithium silicate comprises a compound represented by the following Chemical Formula 1:

$$Li_xSi_yO_z \quad (1),$$

wherein 1≤x≤6, 1≤y≤4, and 0<z≤7.

4. The anode active material for a lithium secondary battery of claim 3, wherein the lithium silicate comprises one or more of $LiSiO_4$, $Li_2SiO_3$, $Li_2SiO_5$, $Li_2Si_2O_5$, $Li_4SiO_4$, and $Li_6Si_2O_7$.

5. The anode active material for a lithium secondary battery of claim 1, wherein the lithium-containing phosphate comprises a compound represented by the following Chemical Formula (2):

$$Li_aP_bO_c \quad (2),$$

wherein 1≤a≤4, 1≤b≤4, and 0<c≤7.

6. The anode active material for a lithium secondary battery of claim 5, wherein the lithium-containing phosphate comprises one or more of $Li_3PO_4$ and $Li_4P_2O_7$.

7. The anode active material for a lithium secondary battery of claim 1, wherein the composite has a core-shell structure comprising:

a core comprising the silicon-based material; and a shell disposed on a surface of the core and comprising the lithium-containing phosphate.

8. The anode active material for a lithium secondary battery of claim 1, further comprising amorphous carbon.

9. The anode active material for a lithium secondary battery of claim 1, further comprising one or more of natural graphite and artificial graphite.

10. An anode for a lithium second battery comprising the anode active material for a lithium secondary battery of claim 1.

11. A lithium secondary battery comprising the anode of claim 10.

12. The anode active material for a lithium secondary battery of claim 1, wherein the peak intensity ratio B/A is 0.04 to 0.31.

13. The anode active material for a lithium secondary battery of claim 1, wherein the peak intensity ratio B/A is more than 0.01 and 0.11 or less.

14. An anode active material for a lithium secondary battery, comprising a composite, the composite comprising:

a silicon-based material comprising a lithium silicate; and a lithium-containing phosphate, wherein the anode active material is characterized by an X-ray diffraction (XRD) pattern having peaks at 22.3 and 28.5°2θ, wherein the peak intensity ratio B/A is more than 0.01 and 0.11 or less, wherein A is the intensity of the peak at 2θ=28.5°, and B is the intensity of the peak at 2θ=22.3°, and wherein the XRD analysis is performed using a Cu-Kα ray.

* * * * *